(12) United States Patent
Wu et al.

(10) Patent No.: US 7,342,389 B1
(45) Date of Patent: Mar. 11, 2008

(54) HIGH EFFICIENCY CHARGE PUMP DC TO DC CONVERTER CIRCUITS AND METHODS

(75) Inventors: Wei Wu, Cupertino, CA (US); Ling Zhu, San Diego, CA (US)

(73) Assignee: Diodes, Inc., Westlake Village, CA (US)

( * ) Notice: Subject to any disclaimer, the term of this patent is extended or adjusted under 35 U.S.C. 154(b) by 0 days.

(21) Appl. No.: 11/651,219

(22) Filed: Jan. 9, 2007

(51) Int. Cl.
*G05F 1/40* (2006.01)
*H02M 3/18* (2006.01)

(52) U.S. Cl. .......................................... 323/288; 363/60
(58) Field of Classification Search ................. 363/59, 363/60; 323/282, 284, 288, 312, 313, 314, 323/351; 327/536
See application file for complete search history.

(56) References Cited

U.S. PATENT DOCUMENTS 6,650,100 B1* 11/2003 Kohout et al. .............. 323/282
6,661,683 B2* 12/2003 Botker et al. ................. 363/60
6,788,039 B2* 9/2004 Abdoulin ..................... 323/288
2002/0109540 A1* 8/2002 Meng ........................... 327/536

* cited by examiner

*Primary Examiner*—Jessica Han
(74) *Attorney, Agent, or Firm*—Fountainhead Law Group P.C.; Chad R. Walsh (57) ABSTRACT

In one embodiment the present invention includes a voltage converter operable in both buck and boost modes. The voltage converter may only include one switched capacitor. A programmable current source, which may be implemented as a switch array, generates a current into the switch capacitor during a first time period to produce a voltage across the capacitor. During a second time period, the voltage may be transferred to the output of the converter, or boosted by coupling the input voltage to one terminal of the switched capacitor coupling the other terminal of the capacitor to the output. A feedback circuit is coupled to a controller for reprogramming the current into the capacitor to maintain the output voltage at desired levels.

22 Claims, 6 Drawing Sheets

Fig. 6

HIGH EFFICIENCY CHARGE PUMP DC TO DC CONVERTER CIRCUITS AND METHODS

BACKGROUND

The present invention relates to voltage converters, and in particular, to high efficiency charge pump DC to DC converter circuits and methods.

Electronic systems are powered by voltages and currents. Voltage converters are circuits that receive an input voltage, typically constant, and output a different voltage for use in an electronic system. Such circuits are commonly used when a certain power supply voltage is available (e.g., a battery voltage), but different voltages are required to drive various system electronics.

One example voltage converter is a DC to DC ("DC/DC") voltage converter. A DC/DC voltage converter receives a constant voltage at one voltage value, rather than a oscillating voltage, and produces another constant voltage at another constant voltage value. One example application of a DC/DC converter is in batter applications. Initially, a battery may produce a certain voltage when it is fully charged. The voltage produced by the battery may be larger than one or more voltages required by one or more system components. Thus, a DC/DC converter may be used to reduce the battery voltage to desired levels. Converters that receive an input voltage and produce an output voltage that is less than the input voltage are commonly referred to as "Buck" converters. As energy in the battery is used, the battery voltage may drop to lower values over time. Thus, over time the voltage produced by the battery may be less than the voltages required by one or more system components. In this case, a DC/DC converter may be used to increase the battery voltage to a desired level. Converters that receive an input voltage and produce an output voltage that is greater than the input voltage are commonly referred to as "Boost" converters.

Common techniques for implementing "Buck" or "Boost" converters include switching power supplies that use external inductors or capacitors. However, such circuits require costly external components and require complex architectures for performing both "Buck" and "Boost" operations. Switched capacitor techniques have been used for "Buck" and "Boost" DC/DC converters, but such circuits also require at least two external capacitors. To reduce costs, it is generally desirable to reduce the number of external components and circuit complexity. It is also desirable to improve the efficiency of such circuits so that power consumption is reduced.

Thus, there is a need for improved voltage converters. The present invention solves these and other problems by providing high efficiency charge pump voltage converter circuits and methods.

SUMMARY

In one embodiment the present invention includes a voltage converter operable in both buck and boost modes. The voltage converter may only include one switched capacitor. A programmable current source, which may be implemented as a switch array, generates a current into the switch capacitor during a first time period to produce a voltage across the capacitor. During a second time period, the voltage may be transferred to the output of the converter, or boosted by coupling the input voltage to one terminal of the switched capacitor coupling the other terminal of the capacitor to the output. A feedback circuit is coupled to a controller for reprogramming the current into the capacitor to maintain the output voltage at desired levels.

In one embodiment the present invention includes a voltage converter comprising a first capacitor having a first terminal and a second terminal, a first switch having a first terminal coupled to the second terminal of the first capacitor and a second terminal for receiving an input voltage, a second switch having a first terminal coupled to the first terminal of the first capacitor and a second terminal for providing an output voltage, a third switch having a first terminal coupled to the second terminal of the first capacitor and a second terminal coupled to a first reference voltage, a programmable current source coupled to the first terminal of the first capacitor, a feedback circuit coupled to the second terminal of the second switch, and a controller coupled to the feedback circuit, wherein during a first time period the third switch is closed, the first and second switches are open, and the programmable current source generates a programmed current into the first capacitor to create a first voltage, and during a second time period, the third switch is open, the first and second switches are closed, and the first voltage is increased by an input voltage, and wherein the feedback circuit generates a feedback signal, and in accordance therewith, the controller changes the programmed current generated by the programmable current source.

The following detailed description and accompanying drawings provide a better understanding of the nature and advantages of the present invention.

DETAILED DESCRIPTION

Described herein are techniques for high efficiency charge pump voltage converter circuits and methods. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
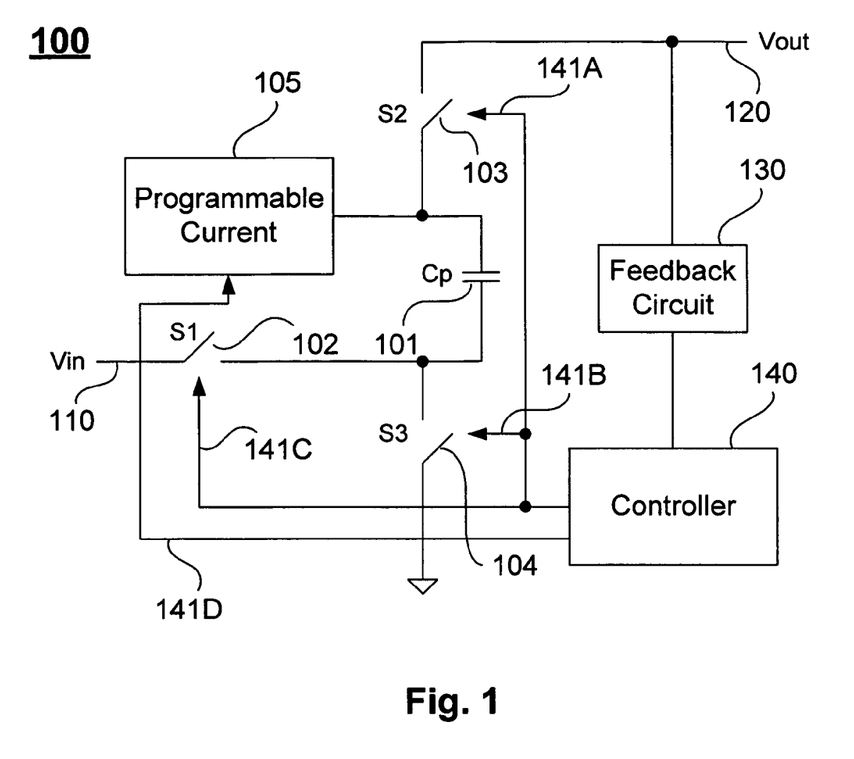
FIG. 1 illustrates a voltage converter according to one embodiment of the present invention.

FIG. 1 illustrates a voltage converter according to one embodiment of the present invention. Voltage converter 100 includes a capacitor 101 ("Cp") a first terminal coupled to a switch 102 ("S1") and another switch 102 ("S3"), and a second terminal coupled to a switch 103 ("S2"). Switch 102 has a first terminal coupled to the second terminal of capacitor 101 and a second terminal coupled to a circuit input terminal for receiving an input voltage, Vin. Switch 103 has a first terminal coupled to the first terminal of capacitor 101 and a second terminal coupled to a circuit output terminal for providing an output voltage, Vout. Switch 104 has a first terminal coupled to the second terminal of capacitor 101 and a second terminal coupled to a first reference voltage, which in this example is ground (i.e., 0 volts). Voltage converter 105 further includes a programmable current source 105 coupled to the first terminal of capacitor 101, a feedback circuit coupled to the second terminal of switch 103 through the output, and a controller 140 coupled to the feedback circuit.

In one embodiment, voltage converter 100 may operate in either a buck or boost mode. In a buck mode, controller 140 generates digital signals 141A-C causing-switches 102 and 103 to open and switch 104 to close for a first time period. Controller 140 further transmits digital signals 141D to programmable current source 105, and current source 105 generates a corresponding current. Accordingly, programmable current source 105 generates a programmed current into one terminal of capacitor 101, and the other terminal of capacitor 101 is coupled to ground. Current is sourced into capacitor 101 for the first time period, resulting in a first voltage on capacitor 101. The time period or the programmed current, or both, may be tailored to achieve the desired voltage on capacitor 101 at the end of the first time period. The first voltage may be some fractional value of the input voltage, for example (i.e., V1<=Vin). During a second time period, controller 140 generates digital signals 141A-C causing switch 103 to close. The first voltage on capacitor 101 is now coupled to the output 120. The first voltage may be sensed by feedback circuit 130, which may include comparing the voltage at the output, or a voltage related thereto, to another reference voltage. Feedback circuit 130 senses the voltage at the output and may perform other processing to generate an output signal to controller 140 indicating whether the voltage is too high or too low. If the voltage at the output is too high, controller 140 generates digital signals to reduce the current provided to capacitor 101 by programmable current source 105, and in accordance therewith, reducing the value of the first voltage at the end of the first time period. If the voltage at the output is too low, controller 140 generates digital signals to increase the current provided to capacitor 101 by programmable current source 105, and in accordance therewith, increasing the value of the first voltage at the end of the first time period. Accordingly, the voltage on the output may be set to any desired value. For example, the feedback circuit may be configured to cause controller 140 to adjust programmable current source 105 to produce current resulting in a fractional value of the input voltage on capacitor 101. Therefore, the output voltage may also be any fractional value of the input voltage.

In a boost mode, controller 140 generates digital signals 141A-C causing switches 102 and 103 to open and switch 104 to close for a first time period. Similar to buck mode, controller 140 further transmits digital signals 141D to programmable current source 105, and current source 105 generates a corresponding current. Accordingly, programmable current source 105 generates a programmed current into one terminal of capacitor 101, and the other terminal of capacitor 101 is coupled to ground. Current is sourced into capacitor 101 for the first time period, resulting in a first voltage on capacitor 101. As before, the time period or the programmed current, or both, may be tailored to achieve the desired voltage on capacitor 101 at the end of the first time period. The first voltage may again be some fractional value of the input voltage, for example (i.e., V1<=Vin). During a second time period, controller 140 generates digital signals 141A-C causing switches 102 and 103 to close and switch 104 to open. The input voltage is now coupled to one terminal of capacitor 101, causing the voltage on the other terminal of capacitor 101 to be increased as follows:

$$Vout = V1 + Vin.$$

The first voltage is effectively boosted by the input voltage. The output voltage may be sensed by feedback circuit 130, which may include comparing the voltage at the output, or a voltage related thereto, to another reference voltage. Feedback circuit 130 senses the voltage at the output and may perform other processing to generate an output signal to controller 140 indicating whether the voltage is too high or too low. If the voltage at the output is too high, controller 140 generates digital signals to reduce the current provided to capacitor 101 by programmable current source 105, and in accordance therewith, reducing the value of the first voltage at the end of the first time period. If the voltage at the output is too low, controller 140 generates digital signals to increase the current provided to capacitor 101 by programmable current source 105, and in accordance therewith, increasing the value of the first voltage at the end of the first time period. Accordingly, the voltage on the output may be boosted to any desired value above the input voltage. For example, the feedback circuit may be configured to cause controller 140 to adjust programmable current source 105 to produce current resulting in a fractional value of the input voltage on capacitor 101. Therefore, the output voltage may be any fractional value above the input voltage.

Figure 2:
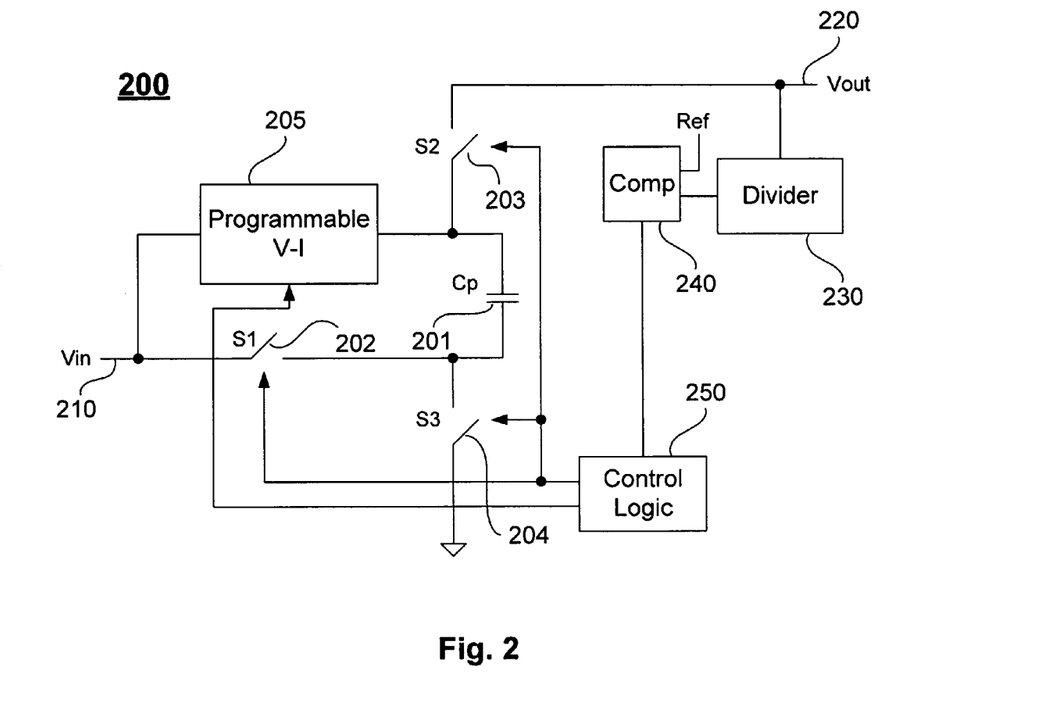
FIG. 2 illustrates a voltage converter according to another embodiment of the present invention.

FIG. 2 illustrates a voltage converter according to another embodiment of the present invention. In this embodiment, the programmable current source is a programmable voltage-to-current converter. Programmable voltage-to-current ("V-I") converter 205 includes an input coupled to input terminal 210 and an output coupled to a first terminal of capacitor 201. Programmable V-I 205 includes digital input terminals for receiving digital signals for programming the amount of current generated at the output for a given input voltage. Switches 202-203 may be controlled to open and close as in the embodiment in FIG. 1 to perform either buck or boost voltage conversions. For a buck conversion, an input voltage is received at the input of programmable V-I 205 and translated into a current, which is provided to capacitor 201 to generate a first voltage. The first voltage may be a fractional value of the input voltage, for example, resulting in a fraction of the input voltage being transferred to the output terminal 220. For boost mode, an input voltage is similarly received at the input of programmable V-I 205 and translated into a current, which is provided to capacitor 201 to generate a first voltage. The first voltage, which may less than or equal to the input voltage, for example, may be boosted by decoupling the second terminal of the capacitor from ground and coupling the second capacitor terminal to the input. The resulting voltage is boosted to a voltage greater than the input voltage and transferred to the output. In this example, in both buck and boost modes, the output voltage is input to a divider circuit 230. The output of the divider circuit may be a voltage, for example, that is a fraction of the value of the output voltage. The divider output is then compared to a reference in a comparator 240. Comparator 240 generates one or more signals indicating whether the divider output is greater than or less than the reference. In this embodiment, the controller is implemented using digital control logic block 250, which may be a state machine, for example. The comparator output is received by control logic 250, and control logic 250 may increase the current generated by the programmable V-I for a given input voltage, thereby increasing the output voltage, if the divider output is less than the reference. Alternatively, control logic 250 may decrease the current generated by the programmable V-I for a given input voltage, thereby decreasing the output voltage, if the divider output is greater than the reference.

Figure 3:
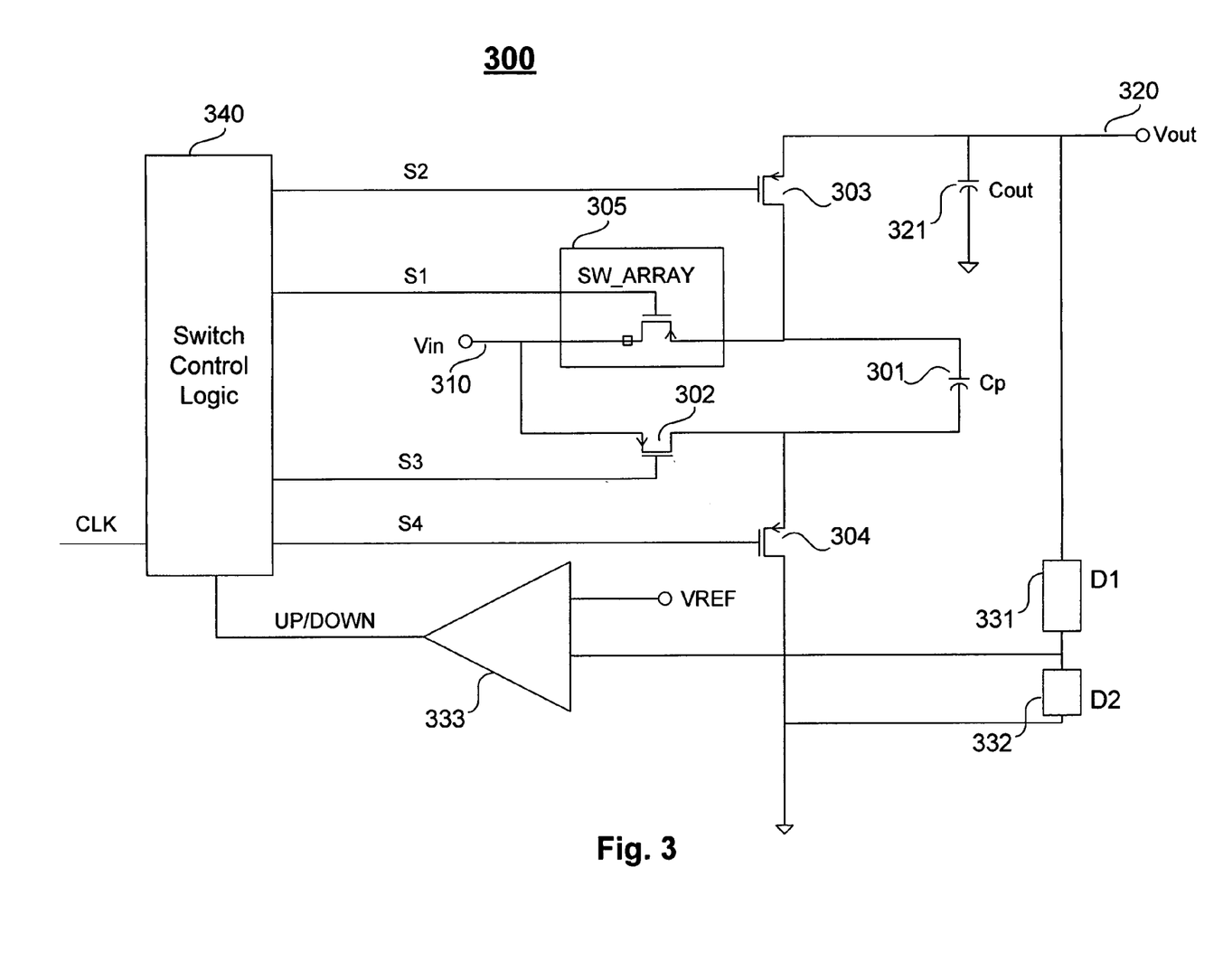
FIG. 3 is an example voltage converter according to one embodiment of the present invention.

FIG. 3 is an example voltage converter 300 according to one embodiment of the present invention. Voltage converter 300 includes an input terminal 310 for receiving an input voltage, Vin. Input terminal 310 is coupled to one terminal of a switch 302. The other terminal of the switch 302 is coupled to a terminal of capacitor 301 ("Cp"). Input terminal 310 is also coupled to a switch array 305, which includes a plurality of switches having terminals coupled to the input terminal 310. The other terminals of the switches in the switch array are coupled to the other terminal of capacitor 301. Switch 304 is coupled between a terminal of capacitor 301 and ground. Switch 303 is coupled between the other terminal of capacitor 301 and output terminal 320. Switches 302, 303, 304, and the switches in switch array 305 may be implemented using PMOS or NMOS transistors, or both, for example. The switches are opened and closed by switch control logic 340. Switch control logic 340 may be generated using VHDL, Verilog, or RTL, for example, and may receive a clock input, CLK. In this example, the output terminal may be coupled to a divider circuit comprising elements 331 and 332. An output capacitor 321 ("Cout") may also be used, but may be much smaller than capacitor 301 so appreciable voltage drop occurs when switch 303 is closed. The divided output voltage is coupled to one input of a comparator 333. The other input of comparator 333 is coupled to a reference voltage. The output of the comparator may include one or more digital signals received by control logic 340 to reprogram switch array 305. If the divided voltage is less than the reference voltage, switch control logic may reprogram the switch array to increase the voltage at the output. If the divided voltage is greater than the reference voltage, switch control logic may reprogram the switch array to decrease the voltage at the output. Voltage to the output may be decreased by reducing the number of switches closed during charging of the capacitor Cp. Voltage to the output may be increased by increasing the number of switches closed during charging of the capacitor Cp.

In one embodiment, the feedback circuit may include a diode, such as a light emitting diode ("LED"). In this example, the divider may include an LED for element 331. Thus, it may be desirable to maintain a voltage at the output sufficient to turn the LED on (e.g., 2-4 volts). The second element 332 of the divider may be a bias transistor, for example, and it may be desirable to maintain the voltage at the input of the comparator at a voltage high enough to maintain the transistor in a conducting state (e.g., greater than or equal to Vdsat). In the example in FIG. 3, the reference voltage to the comparator may be set to a voltage just above Vdsat so that the voltage across the source and drain of a transistor used for element 332 is sufficient to bias the transistor on. Accordingly, the comparator and switch control logic will adjust the switch array to maintain the output at an optimum voltage to turn on the LED at element 331 and bias the transistor at element 332. If a battery is coupled to the input terminal and used as a power source, the voltage at the output may be lower than the initial battery voltage. Under these conditions the system may operate in Buck mode. Because the output voltage is maintained at a level sufficient to power the LED at 331 and bias transistor at 332, power is conserved. Similarly, as the battery voltage drops below the required level at the output, the system may enter a Boost mode, during which period the battery input voltage is increased only enough to drive the LED and bias transistor. By maintaining the voltage at the output only at a sufficient level to drive the LED, and maintaining the voltage across the source and drain of a bias transistor at a minimum level, the battery life for this application may be extended.

Figure 4A:
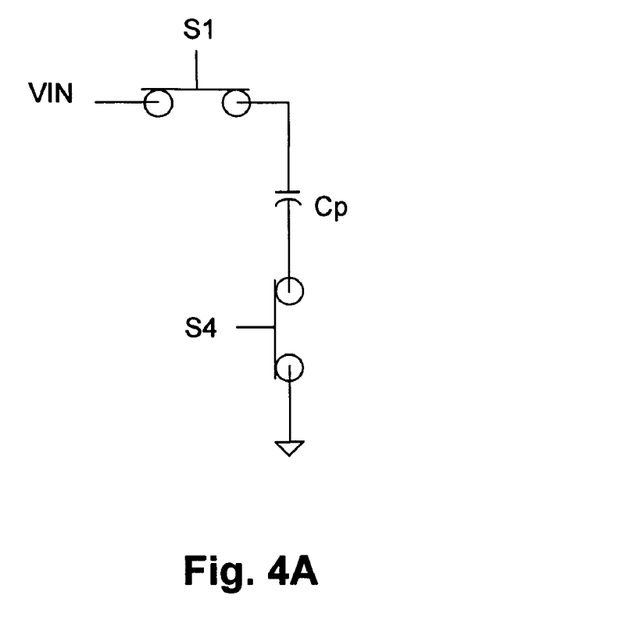
FIGS. 4A-B illustrate buck operation of a voltage converter according to one embodiment of the present invention.
Figure 4B:
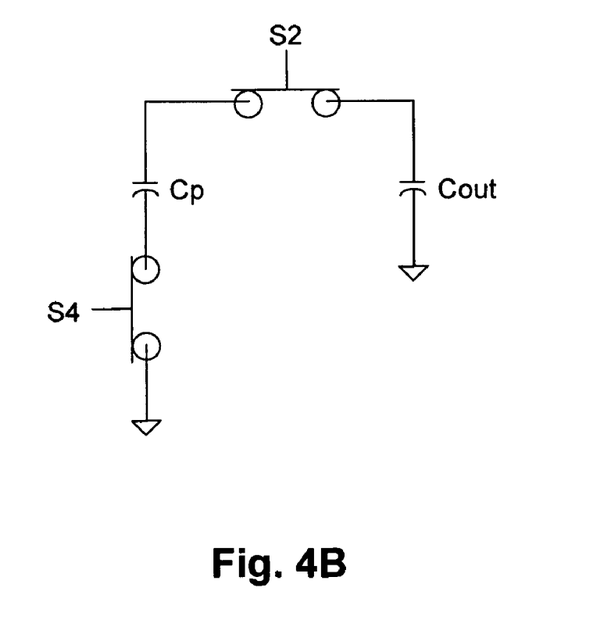

FIGS. 4A-B illustrate buck operation of the voltage converter 300 according to one embodiment of the present invention. During a first time period, switch array 305 translates the input voltage into a current into the capacitor, and the other terminal of the capacitor is coupled to ground. The switch array current results in a voltage on the capacitor that is less than or equal to the input voltage. For example, for any given switch in the switch array, the change in voltage on the capacitor is as follows:

$$\Delta V = i\Delta t/C$$

Thus, the change in voltage caused by the switch array may be controlled by the time the switch is closed and the number of switches placed in parallel. After a voltage is generated on capacitor Cp, the switch control logic 340 opens the switches in the switch array, and closes switch S2, thereby coupling the voltage to the output. The system may operate in this mode as long as the input voltage, such as a battery, is sufficiently high to maintain Vout at the required value (e.g., at a diode voltage plus a bias voltage for an LED application).

Figure 5A:
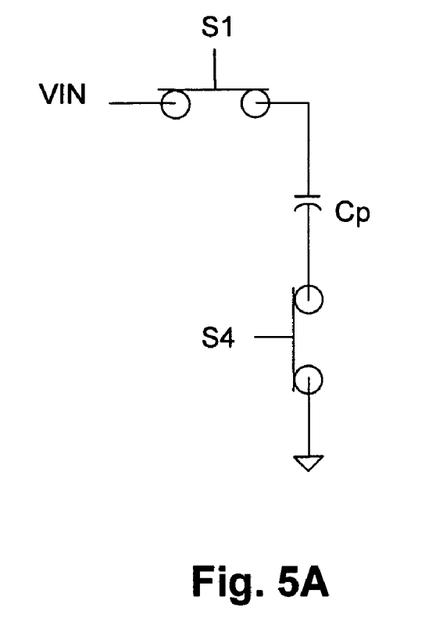
FIGS. 5A-B illustrate boost operation of a voltage converter according to one embodiment of the present invention.
Figure 5B:
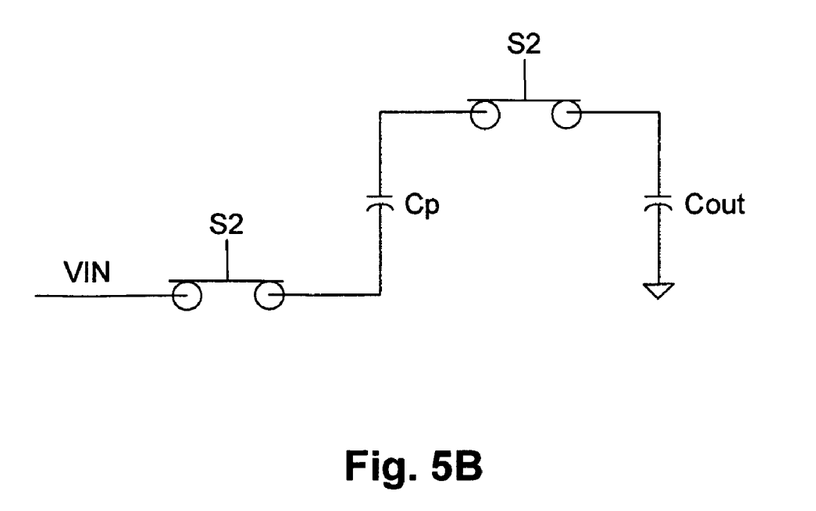

FIGS. 5A-B illustrate boost operation of the voltage converter 300 according to one embodiment of the present invention. During a first time period, switch array 305 translates the input voltage into a current into the capacitor, and the other terminal of the capacitor is coupled to ground. The switch array current results in a voltage on the capacitor that is less than or equal to the input voltage. After a voltage is generated on capacitor Cp, the switch control logic 340 opens switch S4 and the switches in the switch array, and closes switches S2 and S3, thereby coupling the input voltage to one terminal of capacitor Cp, and the other terminal of the capacitor to the output. The initial voltage is boosted by the input. The system may operate in this mode when the input voltage, such as a battery, is not sufficiently high to maintain Vout at the required value.

Figure 6:
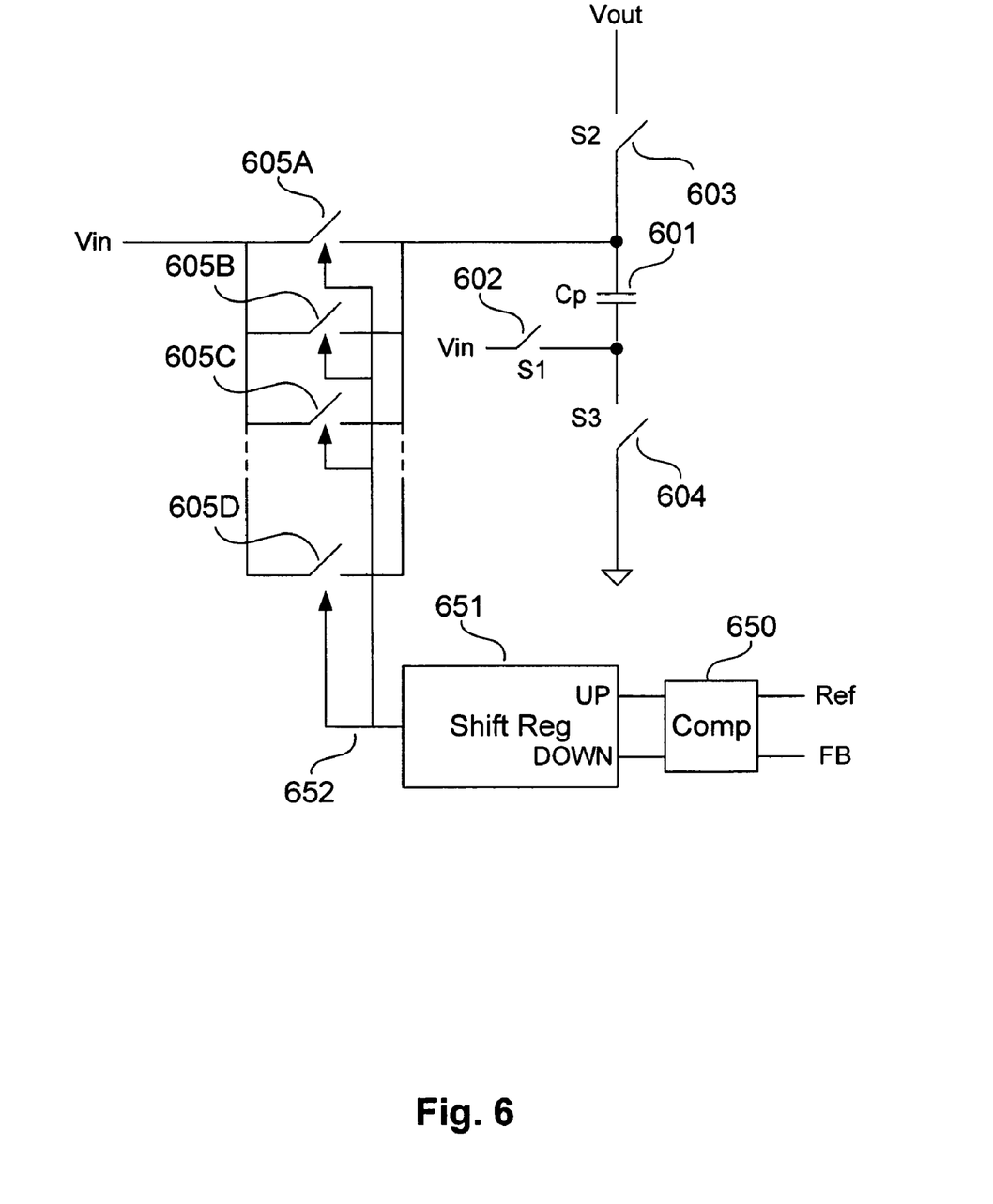
FIG. 6 is an example of a voltage converter according to one embodiment of the present invention.

FIG. 6 is an example of a voltage converter according to one embodiment of the present invention. This example illustrates a switch array. The input voltage, Vin, may be coupled to capacitor 601 either through switch 602 or a switch array comprising a plurality of switches. The switch array may include a large number of individual switches 605A-D, for example. The on-resistance of each switch may be very low (e.g., <0.5 ohms) when each is closed. In one embodiment, the switch array may be divided into groups of switches, and each group of switches may be opened and closed together, independently of other groups. When used in a battery application, Vin will typically be larger, and a fewer number of groups of switches may be closed. Also in this example, the controller is implemented using a shift register 651. Comparator 650 receives a reference input voltage and a feedback input (e.g., from the terminal between a diode and bias transistor). The output of the comparator may generate two signals—a digital output indicating if the feedback input is greater than or less than the reference input, and a complementary signals. The output signals of the comparator may be coupled to UP and DOWN inputs of shift register 651 (e.g., where UP shifts more '1's into the register and DOWN shifts more '0's into the register), and a digital output may be used to control the switch array (e.g., each bit of the register may be coupled to an individual switch). If the feedback signal is too low, the comparator output may signal the UP input of the shift register, which turns on more switches. Similarly, if the feedback signal is too high, the comparator output may signal the DOWN input of the shift register, which turns off more switches. Accordingly, the output is maintained at a desired level.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A voltage converter comprising:
a first capacitor having a first terminal and a second terminal;
a first switch having a first terminal coupled to the second terminal of the first capacitor and a second terminal for receiving an input voltage;
a second switch having a first terminal coupled to the first terminal of the first capacitor and a second terminal for providing an output voltage;
a third switch having a first terminal coupled to the second terminal of the first capacitor and a second terminal coupled to a first reference voltage;
a programmable current source coupled to the first terminal of the first capacitor;
a feedback circuit coupled to the second terminal of the second switch; and
a controller coupled to the feedback circuit,
wherein during a first time period the third switch is closed, the first and second switches are open, and the programmable current source generates a programmed current into the first capacitor to create a first voltage, and during a second time period, the third switch is open, the first and second switches are closed, and the first voltage is increased by an input voltage,
and wherein the feedback circuit generates a feedback signal, and in accordance therewith, the controller changes the programmed current generated by the programmable current source.

2. The voltage converter of claim 1 wherein the programmable current source is a programmable voltage-to-current converter comprising at least one input for receiving the input voltage and at least one output coupled to the first terminal of the first capacitor.

3. The voltage converter of claim 2 wherein programmable current source comprises a plurality of switches coupled between an input terminal and the first terminal of the first capacitor.

4. The voltage converter of claim 1 wherein the feedback circuit comprises a comparator.

5. The voltage converter of claim 1 further comprising a light emitting diode coupled between the second terminal of the second switch and the feedback circuit.

6. The voltage converter of claim 5 further comprising a transistor coupled between the light emitting diode and the first reference voltage.

7. The voltage converter of claim 1 wherein the first switch, the second switch, and the third switch are MOS transistors.

8. A voltage converter comprising:
a first capacitor having a first terminal and a second terminal;
a first switch having a first terminal coupled to the second terminal of the first capacitor and a second terminal for receiving an input voltage;
a second switch having a first terminal coupled to the first terminal of the first capacitor and a second terminal for providing an output voltage;
a third switch having a first terminal coupled to the second terminal of the first capacitor and a second terminal coupled to a first reference voltage;
a programmable current source having an output coupled to the first terminal of the capacitor and a plurality of digital inputs;
a comparator having a first input coupled to a reference voltage and a second input coupled to the second terminal of the second switch; and
a controller having one or more inputs coupled to an output of the comparator and a plurality of digital outputs coupled to the plurality of digital inputs of the programmable current source.

9. The voltage converter of claim 8 wherein programmable current source comprises at least one input for receiving the input voltage.

10. The voltage converter of claim 9 wherein programmable current source comprises a plurality of switches.

11. The voltage converter of claim 10 wherein the first switch, the second switch, the third switch, and the plurality of switches are MOS transistors.

12. The voltage converter of claim 8 further comprising a light emitting diode coupled between the second terminal of the second switch and the second input of the comparator.

13. The voltage converter of claim 12 further comprising a transistor coupled between the second input of the comparator and the first reference voltage.

14. A voltage converter comprising:
a first capacitor having a first terminal and a second terminal;
a first switch having a first terminal coupled to the second terminal of the first capacitor and a second terminal for receiving an input voltage;
a second switch having a first terminal coupled to the first terminal of the first capacitor and a second terminal for providing an output voltage;
a third switch having a first terminal coupled to the second terminal of the first capacitor and a second terminal coupled to a first reference voltage;
a plurality of switches each having an input for receiving the input voltage, an output coupled to the first terminal of the capacitor, and a plurality of digital inputs for turning opening or closing each switch;
a comparator having a first input coupled to a reference voltage and a second input coupled to the second terminal of the second switch; and
a controller having one or more inputs coupled to an output of the comparator and a plurality of digital outputs coupled to the plurality of digital inputs of the programmable current source.

15. The voltage converter of claim 14 wherein the plurality of switches each provide an output current corresponding to the received input voltage.

16. The voltage converter of claim 14 wherein the first switch, the second switch, the third switch, and the plurality of switches are MOS transistors.

17. The voltage converter of claim 14 further comprising a light emitting diode coupled between the second terminal of the second switch the second input of the comparator.

18. The voltage converter of claim 17 further comprising a transistor coupled between the second input of the comparator and the first reference voltage.

19. A voltage converter comprising:
- a first capacitor having a first terminal and a second terminal;
- a first switch having a first terminal coupled to the second terminal of the first capacitor and a second terminal for receiving an input voltage;
- a second switch having a first terminal coupled to the first terminal of the first capacitor and a second terminal for providing an output voltage;
- a third switch having a first terminal coupled to the second terminal of the first capacitor and a second terminal coupled to a first reference voltage;
- means for generating a programmable current coupled to the first terminal of the capacitor;
- means for feeding back the output voltage coupled to the second terminal of the second switch; and
- a digital controller coupled to the feedback circuit,
- wherein during a first time period the third switch is closed, the first and second switches are open, and the programmable current source generates a programmed current into the first capacitor to create a first voltage, and during a second time period, the third switch is open, the first and second switches are closed, and the first voltage is increased by an input voltage,
- and wherein the feedback circuit generates a feedback signal, and in accordance therewith, the controller changes the programmed current generated by the programmable current source.

20. A method of converting voltage comprising:
during first time period,
- generating a first current;
- coupling the first current to a first terminal of a first capacitor, and in accordance therewith, generating a first voltage on the first capacitor, wherein a second terminal of the first capacitor is coupled to a reference voltage;

during a second time period,
- coupling the second terminal of the first capacitor to an input voltage, and in accordance therewith, increasing the first voltage on the first terminal of the capacitor;
- coupling the first terminal of the capacitor to an output terminal;
- comparing the increased first voltage to second reference voltage; and
- increasing or decreasing the first current in accordance with a result of the comparing.

21. The method of claim 20 wherein generating a first current comprises closing one or more of a plurality of switches.

22. The method of claim 20 further comprising coupling the output terminal through a light emitting diode.

* * * * *